Patented Jan. 16, 1923.

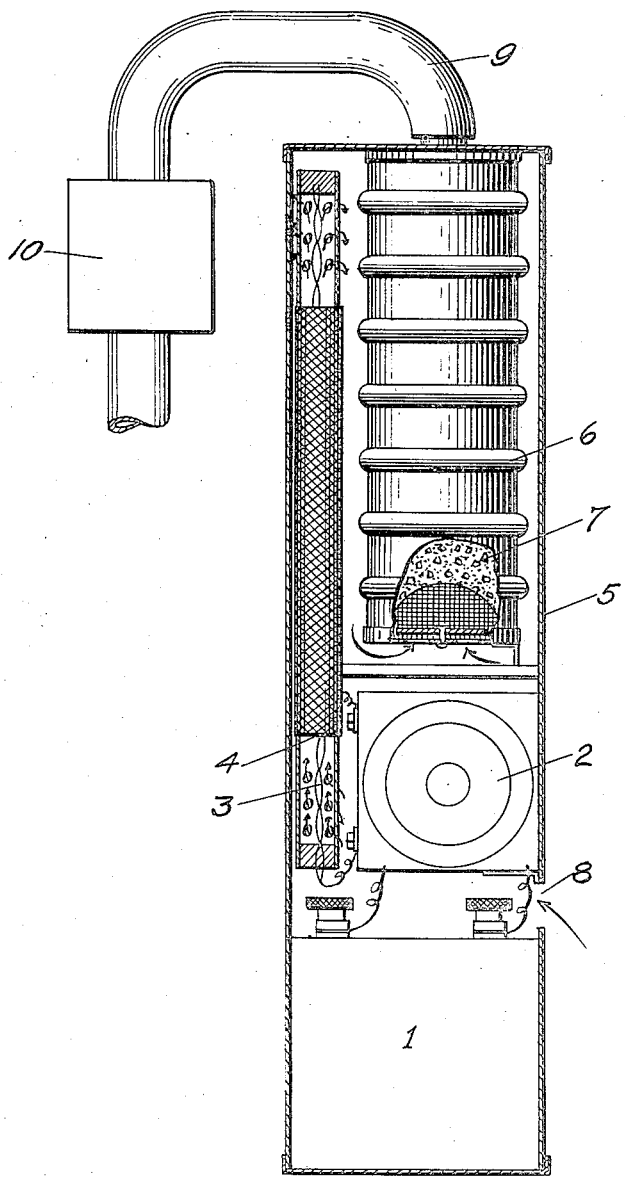

1,442,619

UNITED STATES PATENT OFFICE.

ARTHUR B. LAMB, OF WASHINGTON, DISTRICT OF COLUMBIA.

PROCESS FOR TREATING AIR.

Application filed May 1, 1919. Serial No. 293,912.

*To all whom it may concern:*

Be it known that I, ARTHUR B. LAMB, a citizen of the United States, and residing at Washington, District of Columbia, have invented a new and useful Process for Treating Air, of which the following is a specification.

This invention relates to a method of treating air and has special reference to the removal of objectionable matter therefrom.

Among the objects of this invention is the treatment of air or mixtures of other gases with air so as to precipitate suspended matter of all kinds including dust, metallic particles, smoke particles, pollens, bacteria, liquid and solid particles and infectious matter from the air.

A further object of this invention is to sterilize air by removing bacteria, particles of saliva, minute excreta from respiratory passages and germ laden, disease producing and infectious particles therefrom; also, to remove by means of absorbents objectionable and deleterious gases not otherwise removed during the process.

With these and other objects in view the invention comprises the passing of air through a channel wherein suitable means are provided for producing an electrical discharge, thus causing precipitation of matter suspended therein. The air which is thus freed of suspended particles may then, if desired, be passed through suitable absorbents to selectively remove certain gases still contained therein.

Any suitable apparatus may be used for producing the electrical discharge and for absorbing the gases.

In the accompanying drawing there is illustrated, more or less diagrammatically, an apparatus for carrying out my invention. This apparatus comprises a suitable source of electric current, such as the battery 1, connected to the primary of an induction coil 2. The secondary of this induction coil is connected to the inner and outer electrodes 3 and 4, respectively, of the electric precipitator. The battery 1, induction coil 2 and electric precipitator are positioned within a suitable vessel 5 which also holds the container 6 carrying absorbent material 7.

The air to be treated is drawn or forced through the apparatus, entering at 8 and then passing through the electric precipitator, as indicated by the arrows, during which passage it is subjected to the action of the electric discharge, thus causing precepitation of suspended matter. After undergoing this treatment by the electric precepitator, the air passes into the container 6 and the absorbent material 7 selectively removes the objectionable gases which it is designed to take out from the air undergoing purification and passes out through conduit 9 in a purified state for such uses as desired.

This invention contemplates the treating of air for therapeutic purposes, for example, the sterilization and purification of air which is breathed by patients and attendants in hospitals; also, the treating of bodies of air for the purpose of purifying and sterilizing same and also where it is desired to relieve the bodies of air of their suspended particles.

After the air has been sterilized it may be passed through a humidifier 10 or other suitable apparatus for the purpose of bringing the moisture content thereof to the proper condition. If the air is subjected to the action of electrical discharges and also absorbing material for the purpose of removing objectionable and deleterious gases, it is preferable to subject it to the humidifying treatment after treatment with the absorbents.

In the claims wherever the expression "sterilize" is used it should be understood that it is intended to cover the treatment of air whereby the bacteria and other infectious matter therein is rendered inactive but not destroyed, also where other suspended particles, such as pollens, are treated in like manner.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:—

1. In a method of purifying air, precipitating suspended matter from and sterilizing the air by producing electrical discharges therein and then subjecting the residual air to the action of sorbing material.

2. In a method of purifying air, precipitating suspended matter from and sterilizing the air by passing through channels wherein electrical discharges are produced and then subjecting the residual air to the action of sorbing material.

3. In a method of treating air, precipitating suspended matter from and sterilizing the air by producing electrical discharges therein and then subjecting to the action of a humidifier.

4. In a method of treating air, precipitating suspended matter from and sterilizing the air by producing electrical discharges therein, then subjecting the residual air to the action of sorbing material and then to the action of a humidifier.

5. In a method of treating air, precipitating suspended matter from and sterilizing the air by passing through channels wherein electrical discharges are produced, then subjecting the residual air to the action of sorbing material and then to the action of a humidifier.

ARTHUR B. LAMB.